Oct. 6, 1959   F. MACHATE, JR   2,907,467
COVER
Filed April 29, 1958
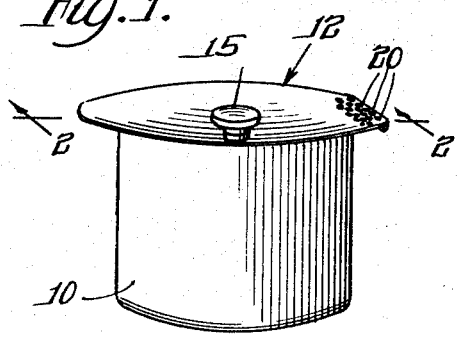
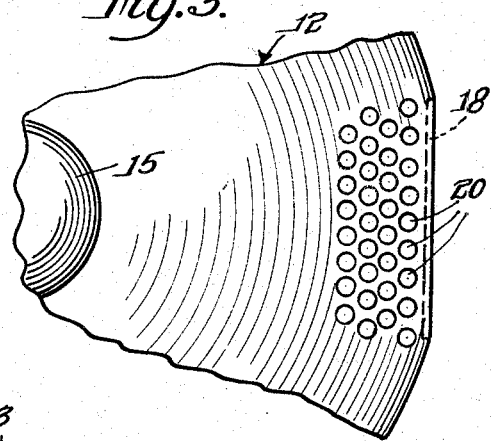
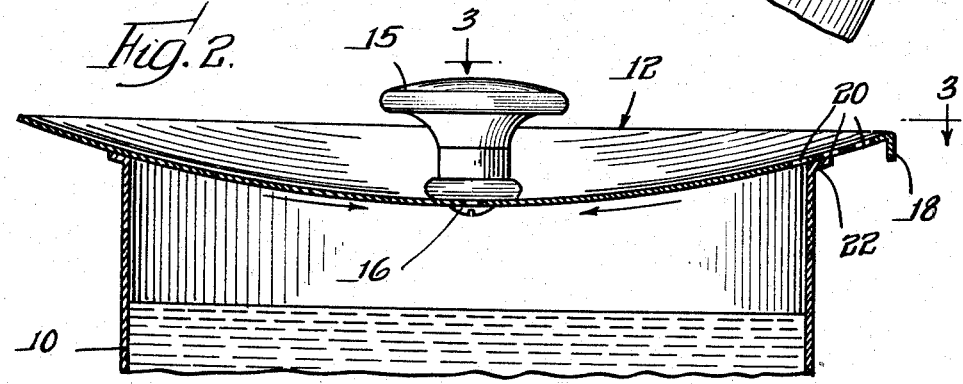
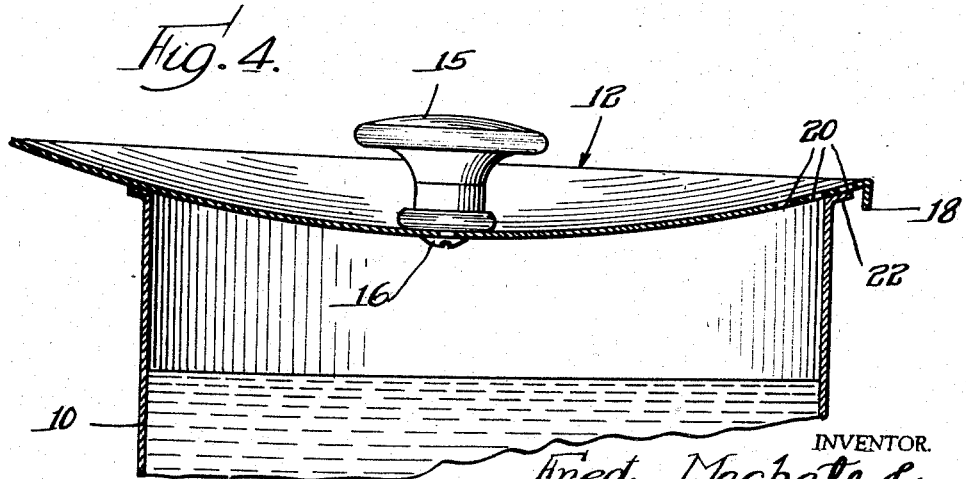
INVENTOR.
Fred Machate Jr.
BY Olson & Trexler
attys

United States Patent Office 2,907,467
Patented Oct. 6, 1959

2,907,467

COVER

Fred Machate, Jr., Lansdale, Pa.

Application April 29, 1958, Serial No. 731,790

4 Claims. (Cl. 210—469)

The present invention relates to a novel cover, and more particularly to a novel cover for cooking pots and pans and the like.

Covers for pots or utensils of the type contemplated herein are usually constructed so that they are suitable for use with pots or pans of only one diameter so that different covers must be provided for each pot or pan having different diameters. Furthermore, presently available covers of the type contemplated herein usually do not incorporate means for permitting steam or the like to escape from the interior of a pot or cooking utensil, and such covers are also usually formed so that any steam or the like condensing on an interior surface thereof may cling thereto. Then when the cover is removed from a pot or cooking utensil, the condensate clinging to the underside thereof may drip therefrom and fall in an undesirable manner onto a counter top or floor, etc.

An important object of the present invention is to provide a novel cover for pots or the like, which cover is of extremely simple and economical construction and may be used with pots or similar utensils of various diameters.

Still another object of the present invention is to provide a novel cover having vent means for permitting the escape of vapor from a pot or cooking utensil, which cover is constructed so that it may be manipulated to adjust the vent means for controlling the emission of vapor.

Still another object of the present invention is to provide a cover for cooking utensils, which cover is constructed so that it may be used to enable liquid to be drained from a cooking utensil while solid material is retained within the utensil.

A further object of the present invention is to provide a novel cover of the above described type which is constructed so that any condensate forming on an under surface thereof tends to gravitate toward a collecting point on the cover and then fall back into the cooking utensil.

Other objects and advantages of the present invention will become apparent to those skilled in the art upon reading the description and considering the accompanying drawings in which:

Fig. 1 is a perspective view of a cover incorporating features of the present invention positioned on a pot or cooking utensil;

Fig. 2 is an enlarged fragmentary vertical sectional view taken generally along line 2—2 in Fig. 1;

Fig. 3 is a fragmentary plan view taken generally along line 3—3 in Fig. 2; and

Fig. 4 is a sectional view similar to Fig. 2 but shows the manner in which the cover may be manipulated for adjusting the vent means.

Referring now more specifically to the drawings wherein like parts are designated by the same numerals throughout the various figures, a cover 12 is shown which incorporates the features of the present invention. The cover is adapted to be applied to a pot or utensil 10 which is generally cylindrical and has a rim 22 defining an upper margin thereof. As may be clearly seen in the drawings, the cover 12 is constructed from a single piece of sheet material. The cover is provided with a concavo-convex configuration, and more specifically, the cover is formed as a segment of a sphere so that it may be applied to utensils of different diameters and manipulated as discussed more fully below.

A knob 15 which provides handle means is secured to the concave side of the cover 12 by means of a screw extending upwardly through the cover and having an enlarged head 16 abutting the under surface of the cover. The knob or handle 15 is preferably made of plastic or any other suitable heat insulating material. It is to be noted that with the arrangement of the knob just described at the concave side of the cover, the convex surface of the cover faces downwardly when the cover is applied to a utensil as shown in the drawings. As a result, any condensate forming on the under convex side of the cover tends to gravitate toward the center of the cover and to the screw head 16 and then fall from the condensate collecting point or screw head back into the utensil.

A short circumferentially extending marginal portion of the cover is bent downwardly along a straight line to provide a depending lip 18 over which liquid from the utensil may be drained or poured as will be described below. A plurality of holes 20 is provided in a restricted section of the cover immediately adjacent the lip 18. The holes 20 are adapted selectively to function as vent means or drain means in the manner described below.

It will be appreciated that since the cover 12 is in the form of a segment of a sphere, it may be used with various utensils having widely different diameters. Furthermore, this construction of the cover enables the cover fully to engage an upper edge of the utensil without necessarily being precisely centered with the utensil as shown, for example, in Fig. 4. This feature enables the cover 12 to be manipulated relative to the utensil for adjusting the vent means or more specifically when the cover is applied to the utensil 10 in the manner shown in Fig. 2, only a small portion of the apertures 20 communicates with the interior of the utensil so that the emission of vapor from the interior of the utensil is restricted. However, the cover may easily be shifted to a second position such as that shown in Fig. 4 for exposing a greater number of the holes 20 to the interior of the utensil so as to enlarge the vent means and facilitate the escape of vapor and the like from the utensil. It will be appreciated that the cover may be moved back and forth relative to the utensil so that all or none or any desired number of the holes 20 are in communication with the interior of the utensil.

The lip 18 may serve to engage the upper edge of the utensil so as to locate the cover in a position with a maximum number of the holes 20 communicating with the interior of the utensil so that maximum venting through the holes is obtained. The lip 18 may also be used to prevent the cover from slipping during draining of the utensil. It will be appreciated that in order to drain the utensil it is only necessary to hold the pot cover by the handle or knob 15 while the pot or utensil is tilted so that the liquid flows out through the holes 20 and over the straight pouring edge and lip 18. Engagement of the lip 18 with the upper edge of the utensil during a draining operation will prevent the cover from slipping accidentally to expose the interior of the utensil so that the cover is effective for retaining solid material within the utensil.

While a specific embodiment of the present invention has been shown and described herein, it is obvious that many details may be changed without departing from the spirit and scope of the appended claims.

The invention is claimed as follows:

1. A device of the type described comprising a concavo-convex cover for pots and similar utensils, said cover being in the form of a segment of a sphere for engaging rims of utensils of different diameters, a handle at the concave side of and connected to a central portion of said cover, and vent means in said cover adjacent a peripheral edge thereof.

2. A device of the type described comprising a concavo-convex cover for pots and similar utensils, a handle disposed at the concave side of and connected to a central portion of said cover, said cover being in the form of a segment of a sphere and being engageable with rims of utensils of different diameters, and a lip formed integrally with and depending from a circumferentially short margin of said cover and being engageable with an upper rim of the utensils, and said cover including aperture means therethrough adjacent said lip.

3. A device of the type described comprising a concavo-convex cover for pots and similar utensils, said cover being in the form of a segment of a sphere for engaging rims of utensils of different diameters, handle means disposed at the concave side of and secured to said cover, and a substantially straight lip integral with and depending from a circumferentially short peripheral segment of said cover, said cover including a plurality of aperture means in a limited area thereof adjacent said lip for selectively providing vent means and drain means, the remainder of said cover being substantially imperforate.

4. A device of the type described comprising a concavo-convex cover for pots and similar utensils, handle means attached to the cover and disposed at the concave side thereof, a circumferentially short lip integral with and depending from a peripheral margin of said cover, and drain means in said cover adjacent said lip.

References Cited in the file of this patent

UNITED STATES PATENTS

| | | |
|---|---|---|
| 1,183,468 | Knight | May 16, 1916 |
| 1,328,558 | Brooks | Jan. 20, 1920 |
| 2,398,978 | Udell | Apr. 23, 1946 |

FOREIGN PATENTS

| | | |
|---|---|---|
| 622,752 | Great Britain | May 6, 1949 |